US00RE36819E

United States Patent [19]

Gellner et al.

[11] E Patent Number: Re. 36,819

[45] Reissued Date of Patent: Aug. 15, 2000

[54] MONOPULSE AZIMUTH RADAR SYSTEM FOR AUTOMOTIVE VEHICLE TRACKING

[75] Inventors: Robert C. Gellner, Santee; Bryan D. Woll, Laguna Niguel; Jerry D. Woll, Poway; John W. Davis, Encinitas; Duane G. Tubbs, La Mesa, all of Calif.

[73] Assignee: Vorad Safety Systems, Inc., Calif.

[21] Appl. No.: 08/661,525

[22] Filed: Jun. 11, 1996

Related U.S. Patent Documents

Reissue of:

[64] Patent No.: 5,402,129
Issued: Mar. 28, 1995
Appl. No.: 08/101,945
Filed: Aug. 4, 1993

[51] Int. Cl.[7] ..... G01S 13/92

[52] U.S. Cl. ..... 342/70

[58] Field of Search ..... 342/70, 71, 149

[56] References Cited

U.S. PATENT DOCUMENTS

| | | | |
|---|---|---|---|
| 4,060,809 | 11/1977 | Baghdady . | |
| 4,106,023 | 8/1978 | Baghdady . | |
| 4,110,754 | 8/1978 | Endo | 342/70 |
| 4,148,028 | 4/1979 | Fujiki | 342/70 |
| 4,203,113 | 5/1980 | Baghdady . | |
| 4,975,710 | 12/1990 | Baghdady . | |
| 5,084,709 | 1/1992 | Baghdady . | |
| 5,229,774 | 7/1993 | Komatsu | 342/149 X |

OTHER PUBLICATIONS

"Introduction to Radar Systems", Skolnik M.I., pp. 160–164, McGraw–Hill, 1980.

*Primary Examiner*—Mark Hellner

*Attorney, Agent, or Firm*—Heller Ehrman White & McAuliffe

[57] ABSTRACT

A monopulse vehicular radar system for tracking a target about an automotive vehicle senses a transmitted signal reflected back from the target and received at two different locations, determines the sum and the difference of the reflected signals sensed at the two locations, and compares the sum and difference to determine the deviation of the target from a reference azimuth. A source frequency provided by a Gunn diode is applied to and transmitted by a two-lobe monopulse antenna. The antenna lobes detect the reflected signals from the target by sensing them at the two different lobes. A hybrid junction provides sum and difference signals to mixers which homodyne the signals to produce sum and difference Doppler frequency signals using the source frequency. The Doppler frequency signals are amplified and then compared to determine the deviation of the target from the reference azimuth. The comparison process can be done digitally by converting the amplified frequency signals to digital signals which are then processed in a digital signal processor, or the comparison may be done in analog fashion using a phase/quotient detector. The range or distance of the target is determined by shifting the source frequency between two frequencies during transmission and frequency shifting the sum and difference Doppler frequency signals in similar fashion following reception by the antenna.

22 Claims, 6 Drawing Sheets

MONOPULSE AZIMUTH RADAR SYSTEM FOR AUTOMOTIVE VEHICLE TRACKING

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to vehicular radar systems, and more particularly to a vehicular collision avoidance radar system which tracks a target within a narrowed radar beamwidth.

2. Description of the Prior Art

There is a continuing need to increase the density of vehicles traveling the world's roadways and simultaneously to improve the safety of highway vehicle operations by preventing highway vehicles from colliding with stationary and moving objects (such as roadside obstacles and other vehicles). One means for accomplishing these seemingly contradictory goals is to monitor the relative speed, direction of travel, and distance between vehicles sharing the roadway, and to use such information to provide direct indications to the vehicle's operator of potential danger. It is becoming increasingly more common for automotive engineers to consider the use of microwave radar systems as a means to monitor such environmental conditions.

Vehicle borne radar systems which transmit and receive at three different frequencies on a time division basis, with two of the frequencies being used to determine range, and the third being combined with one of the first two to determine closing speed and likelihood of collision, are presently known. One such system is disclosed in U.S. Pat. No. 3,952,303 to Watanabe et al., which teaches an analog radar system processing front end.

Another example of an automotive radar system is described in U.S. patent application, Ser. No. 07/695,951, entitled Multi-Frequency Automotive Radar System, and assigned to the assignee of the present invention. In that system, a transmit signal and the reflected received signal are coupled to an RF mixer. The relevant output from the RF mixer is a signal that has a frequency equal to the difference between the transmit and receive frequencies. The frequency of the reflected received signal may be shifted from the frequency of the transmit signal upon its return due to the "Doppler" effect. Doppler effect occurs whenever a transmitted signal reflects off a target that has a motion relative to a transceiver. The resulting frequency shift is referred to as "Doppler shift".

A further example of an automotive radar system, which uses principally a digital approach, is described in U.S. patent application, Ser. No. 07/930,066, entitled Multi-Frequency, Multi-Target Vehicular Radar System Using Digital Signal Processing, and assigned to the assignee of the present invention. In that system, which includes a transmit section for generating a two-channel transmit frequency, an antenna both transmits the transmit signal and receives a reflected receive signal. A diode mixer generates a difference signal having a frequency equal to the transmit frequency minus the received frequency. A signal switch in a front end electronics section time multiplexes and samples the channel one and channel two signals, following which the samples are coupled to a two-channel analog-to-digital converter. A digital electronic section receives the digital information and performs a Fast Fourier Transform on each channel of digital data to determine relative speed and range of a target based upon the frequency and the difference in phase of the two channels. The digital electronic section also receives information regarding the status of vehicle operation and/or controls to determine the degree of danger presented by an identified target.

In vehicular collision avoidance radar systems, it is frequently necessary to know at all times whether or not the target is at an off-boresight (i.e., off-axis) angle relative to a boresight (or reference azimuth), and if so the direction and amount of the angular error (angular deviation from the reference azimuth). It is also desirable or necessary to know the distance or range of the target. To provide for continuous tracking, a number of systems have been proposed including those which transmit a signal and then combine a multiplicity of diversely received replicas of the signal. Examples of such systems are provided by U.S. Pat. Nos. 4,060,809 of Baghdady, 4,975,710 of Baghdady, 5,084,709 of Baghdady, and 5,128,969 of Baghdady. However, such systems have proven to have shortcomings which make them undesirable or impractical when employed for use in vehicular collision avoidance radar systems. Such systems are often lacking in the accuracy by which target deviation from a reference azimuth is measured, and also by the difficulty or inability to define a limited tracking beam so as to be able to track a target within a confined angular range to the exclusion of other potential targets, such as vehicles off to the side of the vehicle carrying the radar system.

The present invention provides a system which limits the beamwidth of a radar system by distinguishing between targets that are at acute angles with respect to a reference azimuth, and those targets that are at obtuse angles with respect to the reference azimuth.

SUMMARY OF THE INVENTION

The present invention provides a vehicular collision avoidance radar system which is capable of tracking a target at an off-boresight angle by continuously determining the deviation of the target from the boresight (or reference azimuth). To accomplish this, a radar system, including a monopulse radar system, is provided which determines both distance, relative motion, and angular displacement from a reference azimuth of a down range target.

The system employs a monopulse antenna designed to provide a tracking beam width of limited and controllable size. In this way, vehicles in the same lane as the vehicle on which the system is mounted or even in an adjacent lane can be identified, distinguished, and tracked, both over straight stretches of highway and around curves, to the exclusion of other potential targets, such as vehicles having an angular displacement greater than a specified angular displacement measured from the reference azimuth.

In vehicular radar systems according to the present invention, a transmission signal is transmitted by the system. The transmission signal reflects off a target and is received at two different locations. The signals received at the two different locations are combined to produce both a sum and a difference signal. The ratio of the sum and difference signal are then used to determine the deviation of the target from the reference azimuth.

A mixer homodynes the sum and difference signals with the source frequency to provide a sum Doppler frequency signal and a difference Doppler frequency signal in the two different channels. The sum and difference frequency signals are each amplified before being analyzed to determine the target deviation. A switch coupled within the two channels may be employed to switch between two frequencies of the source signal, thus demultiplexing the signal. The two frequencies determine the range to the target.

In accordance with the present invention, a multi-lobe monopulse antenna, such as a dual lobe monopulse antenna, may be used to both transmit the transmission signal and receive the transmission signal as reflected by the target to the different lobes of the antenna. A signal source, such as a Gunn diode, is coupled to the antenna through a four-port or four-arm junction. The frequency is transmitted in two different phases by the antenna, causing the signals to sum in a manner that makes it appear as though a single signal was transmitted. The source is periodically switched between two different frequencies so that the range of the target can be determined in known fashion. In accordance with the present invention, the target deviation from the reference azimuth is determined by the quotient of the difference signal divided by the sum signal. In a digital approach, the sum and difference Doppler frequency signals are filtered and then converted to digital equivalents. A digital signal processor is then employed to compute the difference/sum ratio representing the deviation or amount by which the target is off-boresight. An analog approach, in accordance with the present invention, amplifies the sum and difference frequency signals. The signals are then applied to a circuit which squares the sum frequency signal, and multiplies the sum and difference frequency signals. The outputs of the square and multiply circuits are filtered before being applied to a divide circuit coupled to an amplifier for providing a signal representative of the target deviation.

In the analog approach, the deviation of the target is represented by an azimuth voltage which is equal to the ratio of the sum and difference signals. A useful antenna pattern or beamwidth is determined by the angular range between points at which the azimuth voltage peaks and changes direction. The dual lobe monopulse antenna is designed to provide the system with a desired beamwidth, within which the deviation of the target from the reference azimuth may be determined with a high degree of accuracy. At the same time, the beamwidth is selected so as to encompass target vehicles in the same lane or in adjacent lanes, to the exclusion of vehicles and other targets to the side of, and therefore outside of, the beamwidth. Because the beamwidth is determined by selecting only those targets within a specified angular displacement with respect to a reference azimuth, the beamwidth can be dynamically determined (i.e., can change from moment to moment as required by changing conditions, such as curves in the road and changes in the range desired).

In accordance with one embodiment of the present invention, the sum and difference Doppler frequency signals can be applied through corresponding preamplifiers to corresponding pairs of switches. The switch timing is provided by a digital timing generator. The output of each pair of data switches is separated into channels corresponding to the two different transmit frequencies which are coupled through filters to respective pairs of inputs of two analog to digital converters, the timing of which is provided by the timing generator. The outputs of the analog to digital converters are applied to a serial data synchronizer coupled to a line driver for providing the desired output signal. A line receiver may be employed to provide command data to the timing generator.

DETAILED DESCRIPTION OF THE INVENTION

Figure 1:
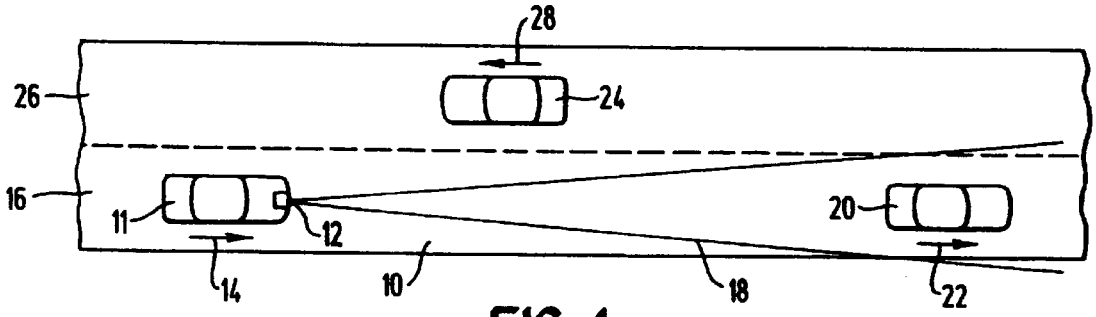
FIG. 1 is a plan view of a section of roadway showing the manner in which a monopulse radar system borne by a vehicle is provided with a desired beamwidth for tracking a target vehicle to the exclusion of other vehicles.

FIG. 1 shows a portion of a roadway 10 which has a vehicle 11 thereon equipped with a monopulse radar system 12 according to the present invention. The vehicle 11 travels in a direction shown by an arrow 14 within a lane 16 of the roadway 10. The monopulse radar system 12 of the vehicle 11 transmits a radar beam 18 extending from the front end of the vehicle 11 where the monopulse radar system 12 is mounted. The radar beam 18 is shown as encompassing a tracked vehicle 20. The tracked vehicle 20 is moving in the same direction as the vehicle 11, as represented by an arrow 22, within the lane 16. A third vehicle 24 is shown in a second lane 26 of the roadway 10, and travelling in an opposite direction from the vehicles 11 and 20, as represented by an arrow 28.

Monopulse radar systems in accordance with the preferred embodiment of the present invention transmit a radar beam 18 which can be adjusted, and which is selected to track targets in the same travel lane as the vehicle on which the system is mounted. For example, it is normally desired that the monopulse radar system 12 of the vehicle 11 be able to scan the lane 16 in which the vehicle 11 is travelling. At the same time, the radar beam 18 must be wide enough to be able to scan the lane 16 through curves in the roadway 10. However, it may be desirable for the radar beam 18 not to be so wide as to include potential targets such as vehicle 24 which is positioned at the side of the vehicle 11, or even vehicles in adjacent travel lanes. Because vehicle 24 is positioned so as to pass by the vehicle 11 safely, the vehicle 11 does not track vehicle 24 when in the position shown in FIG. 1.

Figure 2:
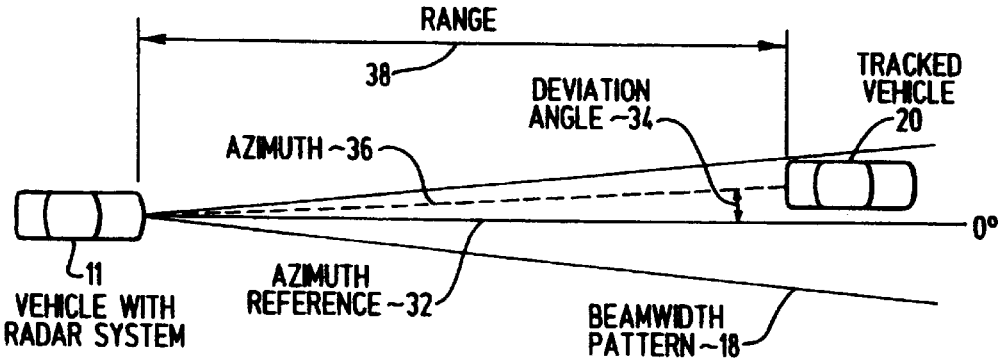
FIG. 2 is a plan view similar to that of FIG. 1, and illustrating the manner in which the radar system determines off-boresight deviation within the beamwidth as well as range of the target.

The manner in which the monopulse radar system 12 of the vehicle 11 uses the radar beam 18 to track targets is shown in FIG. 2. The radar beam 18 includes a 0° reference azimuth 32 extending through the center of the radar beam 18. The monopulse radar system 12 of the vehicle 11 must be capable of tracking targets such as the tracked vehicle 20 within the radar beam 18 by providing a continuous indication of the deviation of the target from the reference azimuth 32 as well as the range and relative motion of the target from the monopulse radar system 12 in the vehicle 11. As described below, the monopulse radar system 12 determines the deviation angle 34 or off-boresight condition of the tracked vehicle 20 based on reflections of transmitted signals received by the monopulse radar system 12 reflected by the tracked vehicle 20. The monopulse radar system 12 calculates a signal representing the actual azimuth 36 of the tracked vehicle 20 in terms of the value of the deviation angle 34 and the sign or direction of the azimuth 36 from the 0° reference azimuth 32. The monopulse radar system 12 also determines the range 38 of the tracked vehicle 20 from the monopulse radar system 12 in conventional fashion using dual frequency transmission and reception.

In accordance with the present invention, the monopulse radar system 12 of the vehicle 11 determines the deviation angle 34 of the tracked vehicle 20 by transmitting a transmission signal and then sensing the transmission signal as reflected back by the tracked vehicle 20 in two different physically separated locations. The transmission signal comprises a source frequency signal transmitted out-of-phase by each lobe of the monopulse antenna in a manner that makes the signal appear to emanate from a single point within the monopulse radar system 12. The transmission signal is then reflected by the tracked vehicle 20 and is sensed as two different received signals at two different physically separated locations. The received signals are summed and subtracted to produce sum and difference signals. The ratio of the resulting sum and difference signals determine the deviation angle 34.

Figure 3:
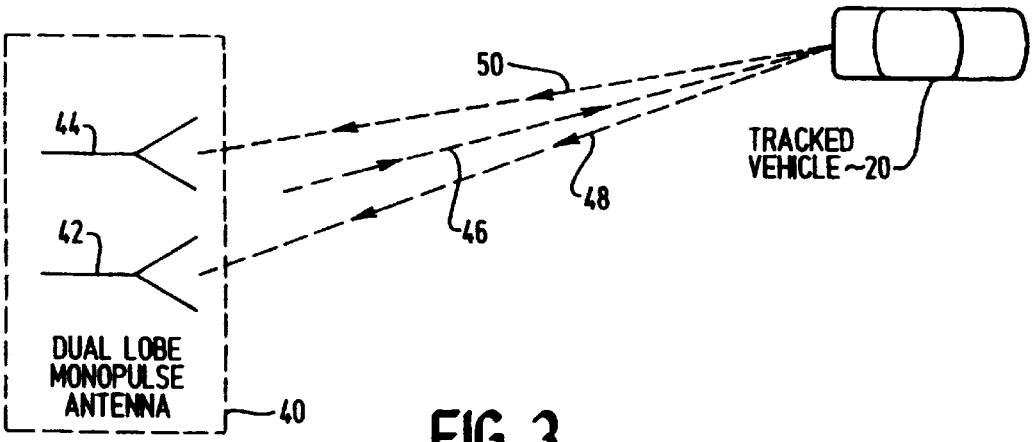
FIG. 3 is a plan view somewhat similar to those of FIGS. 1 and 2 and showing the manner in which a dual lobe monopulse antenna of the radar system transmits a signal and detects reflections thereof from the target vehicle in two different locations.

As shown in FIG. 3, the monopulse radar system 12 employs a dual lobe monopulse antenna 40 for transmitting the transmission signal and receiving the received signals reflected back from the tracked vehicle 20. Due to the phase of the signals transmitted from the two lobes of the monopulse antenna, the transmission signal appears to emanate from a single location within the antenna 40, as represented by a dashed line 46 in FIG. 3. As shown by the dashed line 46, the transmitted signal travels from the antenna 40 to the tracked vehicle 20, where it is reflected. The tracked vehicle 20 reflects the transmission signal back along dashed lines 48 and 50 to the antenna lobes 42 and 44, respectively. As described in detail below, the monopulse radar system 12 determines the amplitude difference between the received signals sensed by the antenna lobes 42 and 44 by determining the sum thereof and the difference therebetween and then computing a ratio of the sum and difference signals.

In order to track a target such as the tracked vehicle 20 at an off-boresight angle, it is necessary to know at virtually all times whether or not an angular error (i.e., angular deviation from the reference azimuth) is present and the sense or direction (sign) of this error. This is accomplished by resolving the received signals from a target into a pair of channels, with one channel of the pair containing the sum of the received signals and the other channel containing the difference between the received signals. A ratio of the sum and difference signal is then computed. Presence of a sum signal while the difference signal is zero indicates that the azimuth 36 of the tracked vehicle 20 coincides with the 0° azimuth 32. Amplification of the sum and difference signals within the two different channels must be essentially identical so as to preserve the magnitude of the ratio. Upon amplification, the sum and difference signals are compared to compute the off-boresight or deviation angle 34.

Monopulse radar systems in accordance with the invention employ an amplitude comparison monopulse technique for off-boresight angle determination. As described in greater detail below, the RF signals received from the offset antenna beams are obtained simultaneously. The sum and difference of the signals received are processed to obtain both the magnitude and the phase of the sum and difference signals. The amplitude comparison monopulse employs two overlapping antenna patterns for obtaining the angular error of the azimuth 36 relative to the planes of the radar beam 18. The two overlapping antenna beams are generated using a single flat antenna in the form of the dual lobe monopulse antenna 40. By comparing the sum and difference of the signals received at each lobe in the manner described below, the sum signal is employed to determine the distance or range 38 of the target. Both the sum and the difference signal are employed to determine the magnitude and sign of the angle error.

Another way to view the present invention is to note that the frequency of the reflected signals received by the antenna lobes 42, 44 are essentially identical. Therefore, the sum of the signals when out of phase by 180° is zero. The sum of the signals when perfectly in phase is twice the magnitude of each. Likewise, the difference of the signals when out of phase by 180° is twice the magnitude of each signal, and zero when the two signals are perfectly in phase.

As the azimuth angle changes from zero, or on-boresight, to off-boresight, the magnitude of the sum and difference signals varies proportionally from zero to twice the magnitude of each. The sign of the magnitude ratio (i.e., whether positive or negative power) of the sum and difference signals can be said to be positive if the sum signal is in phase with the difference signal and negative if the sum signal is 180° out of phase with the difference signal.

Therefore, by determining the magnitude and the phase of the sum and difference signals and taking the ratio of the two, an azimuth voltage is produced which is proportional to the magnitude ratio of the difference signal divided by the sum signal. However, in an embodiment of the present invention in which a digital signal processor determines the relationship of the received signals, an azimuth voltage is not generated. Rather the azimuth angle is represented digitally.

Figure 4:
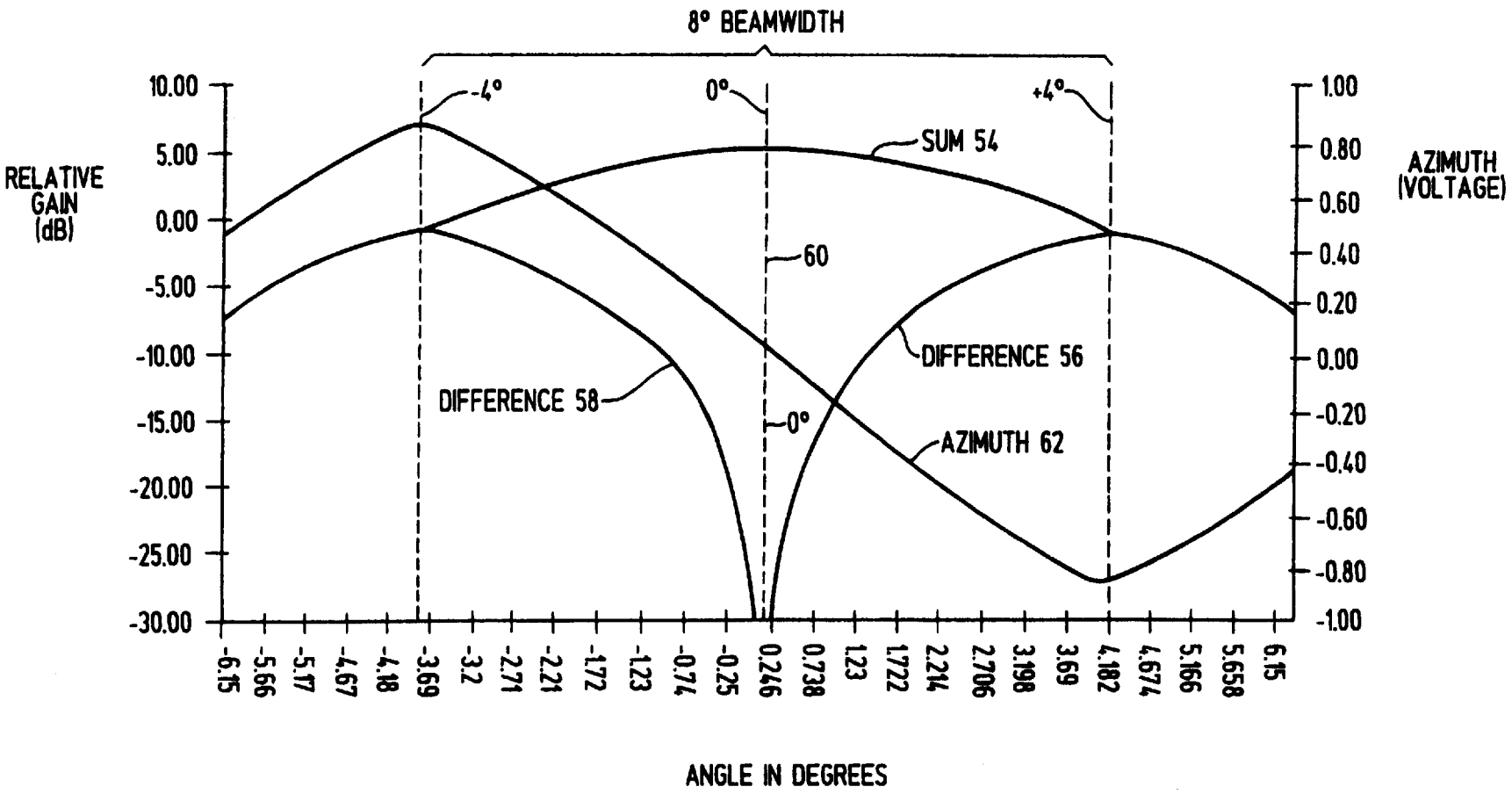
FIG. 4 is a diagrammatic plot of the sum and difference signals in monopulse radar systems according to the present invention, as a function of target deviation in degrees, together with the azimuth voltage produced by comparing the sum and difference signals.

The manner in which the sum and difference signals are employed by the monopulse radar system to determine the azimuth 36 or off-boresight condition of the target is shown by the diagrammatic plot of FIG. 4. FIG. 4 shows a sum signal magnitude 54 and difference signal magnitudes 56 and 58 which are plotted as a function of the angle in degrees of the azimuth 36 of the target. An angle of 0°, representing the reference azimuth 32, is represented by a dashed line 60 in FIG. 4.

As shown in FIG. 4, the difference signal 56 increases from a relative gain of −30.00 dB at an angle just slightly greater than 0° to a relative gain of almost 0.00 dB at an angle of approximately +4.00 degrees. For negative angle values, the difference signal 58 increases from a relative gain of −30.00 dB at an angle slightly less than 0° to a relative gain of almost 0.00 dB at an angle of approximately −4.00 degrees. The sum signal 54 increases from a relative gain of slightly less than 0.00 dB at −4.00 degrees to a maximum value of 5.00 dB at the 0° reference azimuth 32, before it decreases to slightly less than 0.00 dB at an angle of +4.00 degrees. In accordance with the invention, the sum, as represented by the sum signal 54, is compared with the difference, as represented by the difference signals 56 and 58. More specifically, the ratio of the difference signal 56 or 58 to the sum signal 54 produces a voltage representing the azimuth 36 of the target, as shown in FIG. 2. FIG. 4 also shows a plot of an azimuth signal 62 as a function of the ratio of the sum signal 54 and the difference signals 56 and 58. As shown in FIG. 4, the azimuth signal 62, obtained by determining the ratio of the difference signal 56 or 58 to the sum signal 54, has a peak value of just over 0.80 volts at −4.00 degrees and decreases gradually through a value of 0.00 volts at zero degrees to a negative value of slightly greater than minus −0.80 volts at +4.00 degrees. Because the azimuth signal 62 changes directions at angles greater than +4.00 degrees and less than −4.00 degrees, the range between +4.00 degrees and −4.00 degrees determines the useful radar beam of the monopulse radar system, as shown in FIG. 2. FIG. 4 shows the usable radar beam in the present example to be approximately 8° wide.

Using the azimuth signal to determine the angular position of a target with respect to the azimuth reference 32, the effective beamwidth of the radar system can be narrowed by ignoring those targets that are outside a chosen beamwidth. Since the beamwidth can be determined at any moment, and even differently for different distances, this technique allows the system designer to determine the effective antenna pattern. Thus, only targets that are of interest need be tracked. Furthermore, by monitoring the movement of targets, the system processor can determine when the roadway curves. For example, if each of the targets ahead of the system begin to turn at a particular range (which may be mapped to a particular stationary point), then the system is alerted to the fact that the roadway may curve ahead or that an obstacle is present in the travel lane. By tracking the traffic ahead, much in the same way that a person visually maps a roadway in the dark by extrapolating from the tail lights of vehicles ahead, the system receives clues as to the nature of the roadway ahead.

Figure 5:
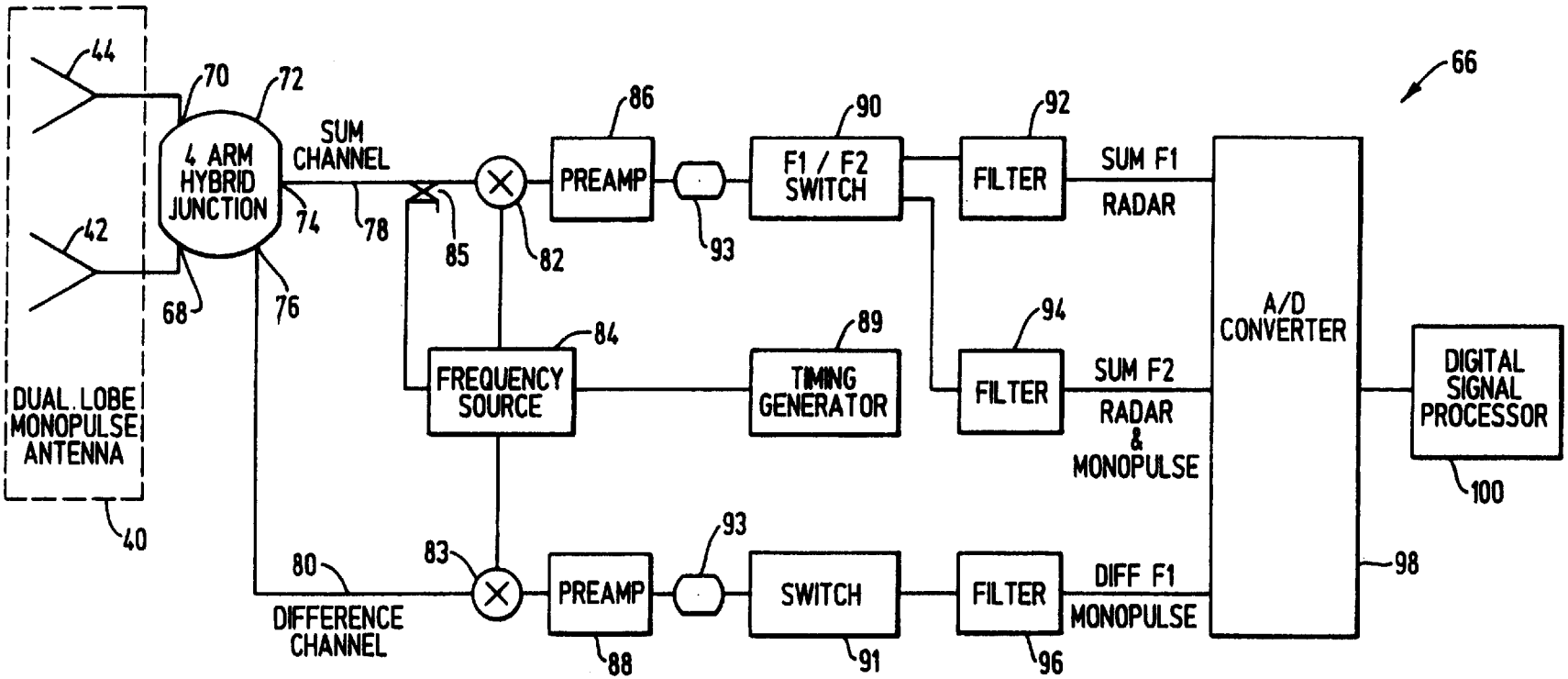
FIG. 5 is a block diagram of a monopulse radar system in accordance with the present invention which determines target deviation using digital processing.

FIG. 5 is a block diagram of a monopulse radar system 66 in accordance with the present invention. The preferred embodiment of the present invention comprises the monopulse radar system 12 of the vehicle 11 in FIGS. 1 and 2, includes the dual lobe monopulse antenna 40 having the lobes 42 and 44. The lobes 42 and 44 are coupled to the first and second arms or ports 68 and 70 of a four arm hybrid junction 72 which has a third arm 74 and a fourth arm 76. A source frequency generated by frequency source 84 is coupled to the third arm 74 of the hybrid junction through a directional coupler 85. Thus, the source signal is transmitted by the lobes 42 and 44 of the antenna 40. The received signals reflected back from the target and sensed by the lobes 42 and 44 are applied to the first and second arms 68 and 70 of the hybrid 72. The output at the third arm 74 is the sum of the signals received at lobes 42, 44. The third arm 74 is coupled to a sum channel 78. The output of the fourth arm 76 is the difference between the signals received at lobe 42 and the signals received at lobe 44. The fourth arm 76 is coupled to a difference channel 80. The sum channel 78 and the difference channel 80 are coupled to mixers 82 and 83 respectively. The mixer 82 homodynes the sum signal in the sum channel 78 with the source frequency (i.e., combines the sum signal with the source signal to produce an output which includes signals having frequencies equal to the difference between the sum signal and source signal frequencies) to provide a sum Doppler frequency signal to a pre-amplifier 86. The mixer 83 homodynes the difference signal in the difference channel 80 with the source frequency to provide a difference Doppler frequency signal to a pre-amplifier 88.

The pre-amplifiers 86 and 88 amplify the sum and difference Doppler frequency signals before applying such signals to an F1/F2 switch 90 or 91. In one embodiment of the present invention, a gain adjustment means, such as a variable attenuator 93 coupled to at least one of the amplifiers 86 or 88, is provided to calibrate the system by equalizing the gain provided to the sum and difference signals. In the preferred embodiment of the present invention, the source frequency alternates between a first and second frequency to provide a multiplexed two frequency signal for determining range in known fashion. A timing generator circuit 89 controls the timing of the frequencies of the source 84 and synchronizes the switches 90 and 91 to the changes in frequency. Thus, each output of each switch is frequency demultiplexed. The use of the two different frequencies F1 and F2 enables the sum signal within the sum channel 78 to be processed to determine the distance, or range 38, of a target in conventional dual frequency fashion. The sum signal is also used to determine the relative motion of a target with respect to the receiving antenna, in known fashion. Similarly, in an alternative embodiment of the present invention, the difference channel can be demultiplexed to improve range accuracy.

The outputs of the switches 90 and 91 of FIG. 5 are filtered by three different filters 92, 94, and 96 to provide a first sum signal, a second sum signal, and a difference signal, respectively. The three signals are converted to corresponding digital signals by an analog to digital (A/D) converter 98. The digitized signals provided by the converter 98 are applied to a digital signal processor 100. The digital signal processor 100 compares the sum and difference signals in the sum channel 78 and the difference channel 80 by determining the ratio of the amplitude and the relative phase of the difference signal and the sum signal. The result is a digital representation of a signal corresponding to the azimuth signal 62 of FIG. 4 and indicates the deviation angle 34 of the target. In the preferred embodiment of the present invention, the same digital signal processor 100 is used to calculate the range, relative motion, and relative azimuth angle of a target.

Figure 6:
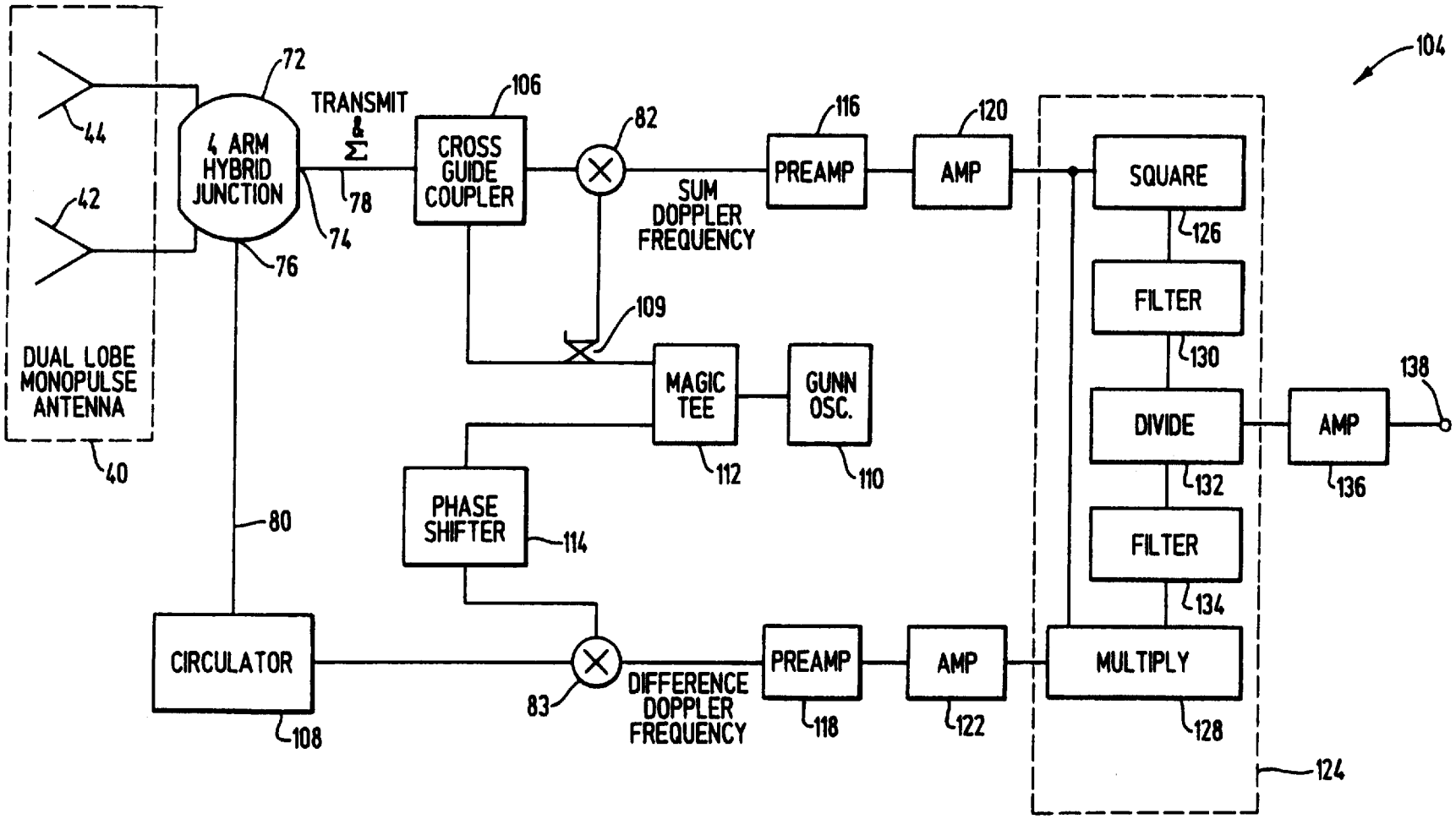
FIG. 6 is a block diagram of a monopulse radar system which is similar to that shown in FIG. 5 but which shows the mixer in greater detail and uses an analog approach to determine target deviation.

FIG. 6 shows a further example of a monopulse radar system 104 in accordance with the invention. The monopulse radar system 104 of FIG. 6 includes the antenna 40, with its lobes 42 and 44, the 4-arm hybrid junction 72 and the mixers 82 and 83. The source signal is produced by a frequency source, such as a Gunn diode 110. A power splitting device, such as a "magic tee" 112, divides the output of the Gunn diode 110 between the sum channel 78 and difference channel 80. That portion of the signal that is routed to the sum channel 78 preferrably enters a first directional coupler 109, which couples part of the signal to the mixer 82 and part to a cross guide coupler 106. The cross guide coupler 106 couples the source signal from the Gunn diode to the third arm 74 of the hybrid junction 72. The source signal is then divided between the two lobes 44 and 42 of the antenna 40 by the hybrid 72. As is the case in the system of FIG. 5, due to the phase relationship of the signals transmitted from each lobe 42 and 44 of the antenna 40, the transmitted signal appears to emanate from a single point. The reflection of the transmit signal is received by each lobe 42 and 44 of the antenna 40 and coupled to the hybrid 72. The hybrid 72 provides a sum signal to the sum channel 78 and a difference signal to the difference channel 80.

The received sum signal is coupled to the sum channel 78 and the received difference signal to the difference channel 80. The sum signal is coupled from the third arm 74 of the hybrid 72 to the cross guide coupler 106. The cross guide coupler 106 couples the signal to the mixer 82, which homodynes the received signal with the source signal. The source frequency is provided to the mixer 82 by the Gunn oscillator 110 coupled through the magic tee 112 to the directional coupler 109. The other output from the magic tee 112 is coupled through a phase shifter 114 to the mixer 83, which homodynes the difference signal.

The difference signal is coupled to the mixer 83 through a circulator 108. The circulator 108 provides isolation between the sum channel 78 and the difference channel 80. The phase shifter 114 equalizes the electrical length of the sum and difference channels 78 and 80 (i.e., ensures that the length of the sum signal path and the length of the difference signal path are the same fractional portion of a wavelength, plus any integral number of wavelengths, at a particular frequency of interest). The magic tee 112 isolates the sum and difference channels 78 and 80 while ensuring an in-phase equal power frequency to the sum and difference mixers 82 and 83.

At the outputs of the mixers 82 and 83, the sum and difference Doppler frequency signals in the channels 78 and 80 are amplified by a pair of pre-amplifiers 116 and 118, then by a pair of amplifiers 120 and 122. The pre-amplifiers 116 and 118 comprise 40 dB gain low noise pre-amplifiers, and the amplifiers 120 and 122 comprise 40 dB amplifiers.

In the monopulse radar system 104 of FIG. 6, unlike the monopulse radar system 66 of FIG. 5, the comparison of the sum and difference signals is accomplished in analog rather than in digital fashion. To accomplish this, the monopulse radar system 104 utilizes a phase/quotient detector 124. The detector 124 includes a squaring circuit 126 for squaring the sum Doppler frequency signal as amplified by the pre-amplifier 116 and the amplifier 120. The sum Doppler signal is also applied to a multiply circuit 128 together with the difference Doppler frequency signal as amplified by the pre-amplifier 118 and the amplifier 122 within the difference channel 80. The output of the squaring circuit 126 is applied through a filter 130, which comprises a 4-pole 15 Hz low pass filter, for filtering out double frequency terms. The signal from the squaring circuit 126 as filtered by the filter 130 is provided to a divide circuit 132. In similar fashion, a filter 134 which couples the output of the multiply circuit 128 to the divide circuit 132 filters out the double frequency terms. The essentially DC voltage provided by the divide circuit 132 is amplified by an amplifier 136 to provide a signal at an output terminal 138 which represents the deviation angle 34 shown in FIG. 2.

Figure 7:
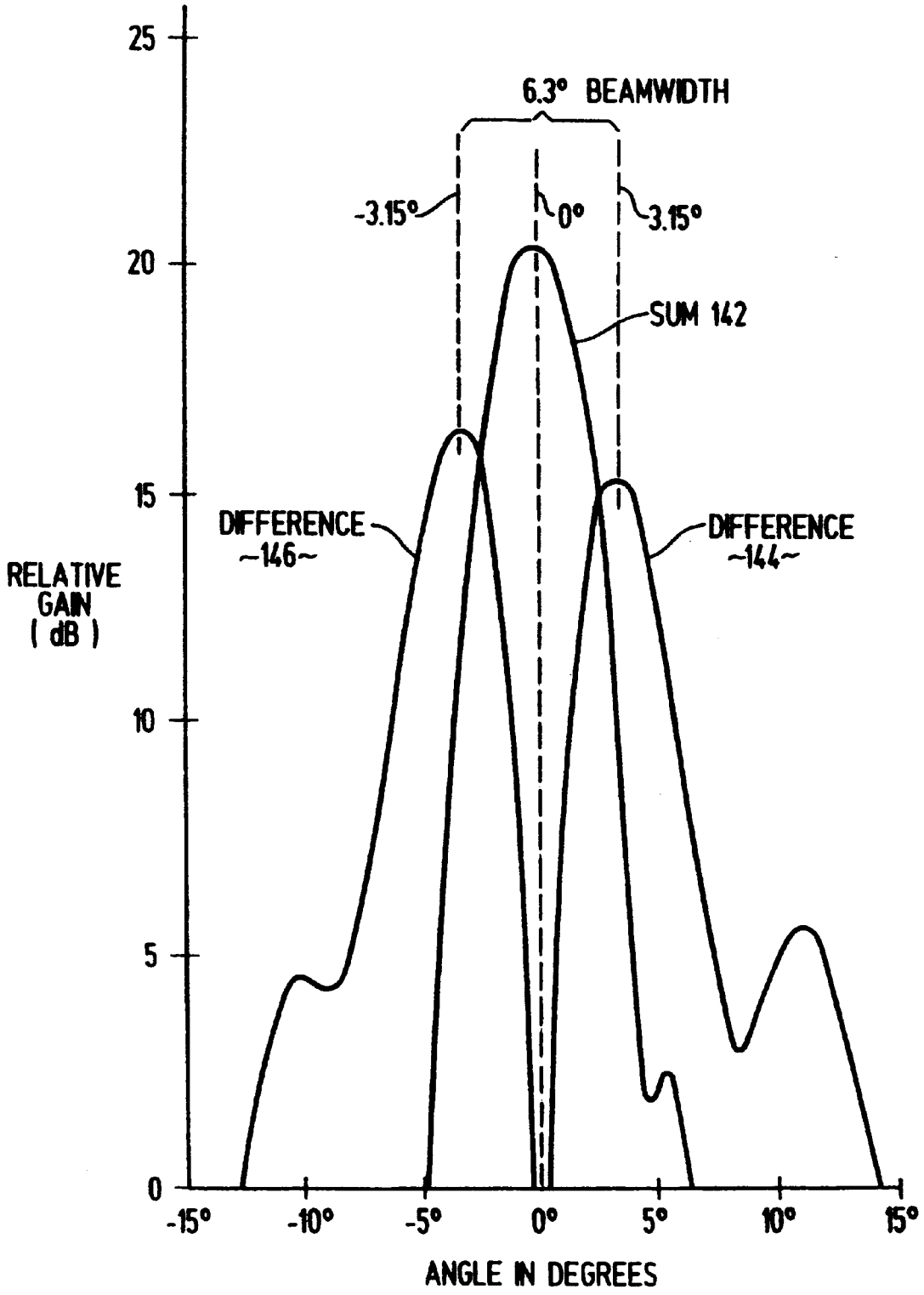
FIG. 7 is a diagrammatic plot of the sum and difference signals produced by a dual lobe monopulse antenna actually constructed and successfully tested in accordance with the present invention.

FIG. 7 shows the sum and difference signals which were obtained by constructing and testing a dual lobe monopulse antenna and using it in a monopulse radar system according to the invention. As shown in FIG. 7, the antenna produced a sum signal 142 and difference signals 144 and 146. The peaks of the difference signals 144 and 146 occur at approximately +3.15° degrees and −3.15° respectively, providing an effective beamwidth of 6.3°.

Figure 8:
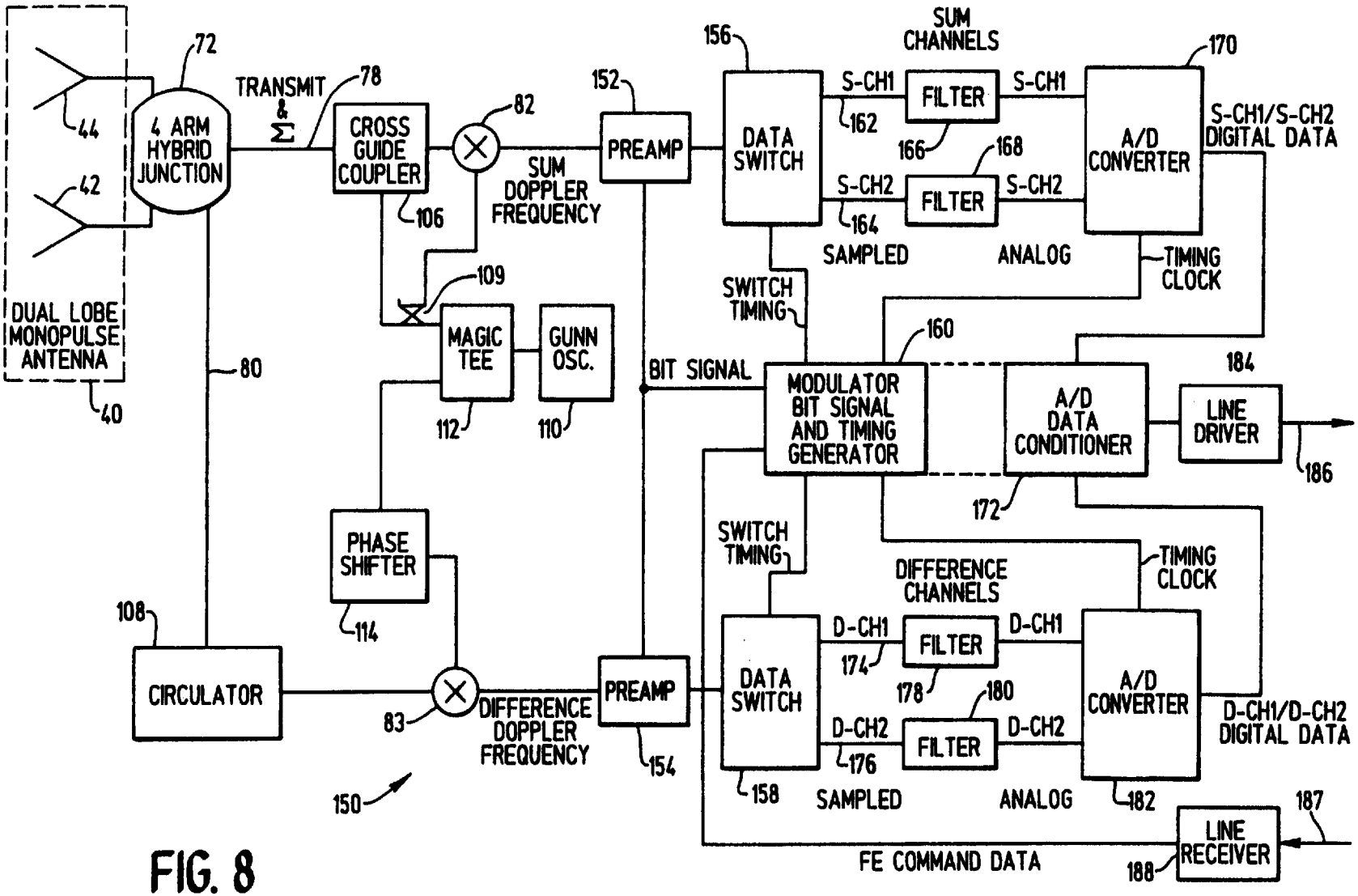
FIG. 8 is a block diagram of a monopulse radar system which is somewhat similar to that of FIG. 6 but which employs a different arrangement for processing the sum and difference Doppler frequency signals produced by the mixer.

A further example of a monopulse radar system 150 in accordance with the invention is shown in FIG. 8. The monopulse radar system 150 is similar to the monopulse radar system 104 of FIG. 6, in that it employs the antenna 40, the hybrid 72 and the mixers 82 and 83 to produce the sum and difference Doppler frequency signals in the sum channel 78 and the difference channel 80 in similar fashion. However, in an alternative embodiment of the present invention, the output of the hybrid junction 72 outputs the received signals without generating the sum and difference signals. In such an embodiment, the digital signal processor 100 determines the sum and difference of the signals received at each of the antenna lobes.

In the system 150 of FIG. 8, the sum Doppler frequency signal is applied through a pre-amplifier 152 to a data switch 156. At the same time, the difference Doppler frequency signal is applied via a pre-amplifier 154 to a data switch 158. In one embodiment of the present invention, the pre-amplifiers 152 and 154 receive a built-in-test (BIT) signal produced by a BIT signal generator within the modulator, BIT signal, and timing generator 160. The modulator, BIT signal, and timing generator 160 also provides switch timing signals for controlling the data switches 156 and 158. The data switch 156 produces sampled signals S-CH1 and S-CH2 on two different channels 162 and 164 to filters 166 and 168. The outputs of the filters 166 and 168 comprising analog values S-CH1 and S-CH2 are applied to two different inputs of an analog to digital (A/D) converter 170. The output of the A/D converter 170 comprising S-CH1 and S-CH2 digital data is provided to an analog to digital (A/D) data conditioner 172 under the control of a timing clock provided by the modulator, BIT signal, and timing generator 160.

The outputs of the data switch 156 comprise the channels 162 and 164 which are sum channels. In similar fashion, the data switch 158 has a pair of outputs comprising difference channels 174 and 176 for the sampled signals D-CH1 and D-CH2. The channels 174 and 176 are coupled through filters 178 and 180 to provide analog signals D-CH1 and D-CH2 to the two different inputs of an analog to digital (A/D) converter 182. The output of the A/D converter 182 comprising D-CH1 and D-CH2 digital data is provided to the A/D data conditioner 172 under the control of a timing clock from the modulator, BIT signal, and timing generator 160.

The single output of the A/D data conditioner 172 is coupled through a line driver 184 to a twisted pair of leads 186. The sum and difference data from the four channels 162, 164, 174 and 176 is thereby combined with a frame sync and serial clock, for transmission over the single twisted pair 186. A second twisted pair 187 is also coupled through a line receiver 188 to provide FE command data to the modulator, BIT signal, and timing generator 160.

The embodiment of FIG. 8 provides a means for checking the accuracy of the system by calculating range and relative motion information from both the sum and the difference channel. Furthermore, the use of both the sum and difference channel to determine range and relative motion provides a greater effective beamwidth, since the difference signal has higher gain at angles distant from the reference azimuth.

A number of embodiments of the present invention have been described. Nevertheless, it will be understood that various modifications may be made without departing from the spirit and scope of the invention. For example, the present invention may use any well known method for determining the range and relative motion of the targets. A number of methods for determining the ratio of the sum and difference signals may be possible. The particular method used to determine this ratio is not relevant to the present invention.

Accordingly, it is to be understood that the invention is not to be limited by the specific illustrated embodiment, but only by the scope of the appended claims.

We claim:

1. A vehicular radar system for determining the deviation of at least one target about an automotive vehicle relative to a reference azimuth, comprising the combination of:

(a) means for transmitting a transmission signal;

(b) means for sensing the transmission signal reflected from at least one target and received at two different locations as two different receive signals;

(c) means for converting each of the two different received signals to two different doppler signals by homodyning each received signal with the transmitted frequency;

(d) means responsive to the two different doppler signals for [determining the sum of and the difference between the two different doppler signals] *providing sum and difference signals of the two different doppler signals*; and (e) means for comparing the sum and difference *signals* to determine the deviation of the target from the reference azimuth.

2. The vehicular radar system of claim 1, wherein the means responsive to the two different doppler signals [for determining the sum and the difference between the two different doppler signals] is a digital signal processor.

3. The vehicular radar system of claim 1, wherein the means for transmitting a transmission signal includes an antenna having at least one pair of lobes for transmitting the transmission signal with a phase difference therebetween and the means for sensing includes the antenna and uses the two lobes to sense the reflected transmission signal at two different locations.

4. The vehicular radar system of claim 3, wherein the means [responsive to the two different receive signals for determining the sum of and the difference between the two different receive signals] *for converting* includes a 4-arm junction having first and second arms coupled to the pair of lobes of the antenna and third and fourth arms for providing the sum and the difference.

5. The vehicular radar system of claim 4, wherein the means for converting is a mixer for mixing the sum and the difference at the third and fourth arms of 4-arm junction with a source frequency to provide sum and difference doppler frequency signals.

6. The vehicular radar system of claim 5, wherein the means for comparing [the sum and the difference] includes means for dividing the difference frequency signal by the sum frequency signal.

[7. The vehicular radar system of claim 1, wherein the means responsive to the two different receive signals for determining the sum of and the difference between the two different doppler signals is a digital signal processor.]

8. A vehicular radar system for determining the deviation of a target about an automotive vehicle relative to a reference azimuth, comprising the combination of:

(a) at least one mixer having a source frequency provided thereto;

(b) antenna means for transmitting and receiving signals;

(c) junction means for coupling the mixers to the antenna means to provide the source frequency to the antenna means for transmission therefrom as a transmission signal;

(d) [the antenna means including] means for detecting [the] *a* transmission signal reflected from the target and received at two different locations and coupled to the junction to provide *signals comprising* the sum of and the difference between the transmission signal detected by the means for detecting at the two different locations; and (e) means for comparing the sum and the difference *signals* to determine the deviation of the target from the reference azimuth, wherein the mixers are responsive to the junction means to homodyne the sum and difference *signals* in accordance with the source frequency to produce sum and difference doppler signals.

9. The vehicular radar system of claim 8, further including means for amplifying the sum and difference frequency signals.

10. The vehicular radar system of claim 9, further including gain adjustment means, coupled to the amplifying means, for adjusting the gain of at least one of the sum and difference frequency signals.

11. The vehicular radar system of claim 9, wherein the source frequency provided to the mixer is repeatedly alternated between first and second frequencies, and further including means responsive to the sum frequency signal and to the repeated alternating of the source frequency between the first and second frequencies for determining the range of the target.

12. The vehicular radar system of claim 9, further including means for filtering the amplified sum and difference frequency signals to provide filtered signals, and analog-to-digital converter means for converting the filtered signals to digital signals, and wherein the means for comparing the sum and the difference comprises a digital signal processor coupled to receive the digital signals.

13. The vehicular radar system of claim 9, wherein the means for comparing the sum and the difference comprises a phase/quotient detector comprising a squaring circuit coupled to receive the amplified sum frequency signal, a multiply circuit coupled to receive the amplified sum and difference frequency signals, first and second filters, a divide circuit coupled to the squaring circuit through the first filter and to the multiply circuit through the second filter, the divide circuit providing a signal representative of the direction of the target from the reference azimuth.

14. The vehicular radar system of claim 8, wherein the antenna means comprises a dual lobe monopulse antenna having a pair of lobes coupled to first and second arms of the junction means.

15. The vehicular radar system of claim 14, wherein the junction means has a third arm coupled to the *at least one* mixer and a fourth arm coupled to the *at least one* mixer through a circulator.

16. The vehicular radar system of claim 15, wherein the *at least one* mixer comprises a first cross guide coupler coupled to the third arm of the junction means, a [second cross guide coupler] *circulator* coupled to the fourth arm of the junction means, a phase shifter coupled to the [second cross guide coupler] *circulator*, an oscillator for providing the source frequency, and an isolating tee coupling the oscillator to the first cross guide coupler and to the phase shifter.

17. A vehicular radar system for tracking a target about an automotive vehicle, comprising the combination of:

(a) a multi-lobe monopulse antenna;

(b) a junction coupled to the antenna and having at least a sum port and a difference port;

(c) mixer means, coupled to the sum and difference ports of the junction and including a source frequency generator, for providing a transmission signal to the antenna through the sum port of the junction, the mixer means being operative to mix sum and difference signals at the sum and difference ports of the junction with the source frequency to produce a sum frequency signal and a difference frequency signal;

(d) first and second data switches coupled to receive the sum frequency signal and the difference frequency signal;

(e) a first, second, third and fourth filter;

(f) an analog-to-digital converter coupled to the first data switch through the first and second filters and coupled to the second data switch through the third and fourth filters;

(g) a timing generator for providing switch timing signals to the first and second data switches and timing clock signals to the analog-to-digital converter;

(h) an analog-to-digital data conditioner coupled to the analog-to-digital converter; and (i) a line driver coupled to the data conditioner.

18. A vehicular radar system for tracking a target about an automotive vehicle, comprising the combination of:

(a) a dual lobe monopulse antenna;

(b) a junction coupled to the antenna and having a sum port and a difference port;

(c) [a] *at least one* mixer coupled to the sum and difference ports of the junction and including a source frequency generator [for providing] *that provides* a transmission signal to the antenna through the sum port of the junction, the mixer being operative to mix sum and difference signals at the sum and difference ports of the junction with the source frequency to produce a sum frequency signal and a difference frequency signal;

(d) first and second data switches coupled to receive the sum frequency signal and the difference frequency signal;

(e) a first, second, third and fourth filter;

(f) first and second analog-to-digital converters, the first converter being coupled to the first data switch through first and second filters and the second converter being coupled to the second data switch through third and fourth filters;

(g) a timing generator [for providing] *that provides* switch timing signals to the first and second data switches and timing clock signals to the first and second analog-to-digital converters;

(h) an analog-to-digital data conditioner coupled to the first and second analog-to-digital converter; and (i) a line driver coupled to the data conditioner.

19. The vehicular radar system of claim 18, further including a line receiver coupled to provide command data to the timing generator.

20. The vehicular radar system of claim 18, further including first and second preamplifiers coupled between the mixer and the first and second data switches, and wherein the timing generator is operative to provide BIT signals to the first and second preamplifiers.

*21. A method for determining the deviation of at least one target about an automotive vehicle relative to a reference azimuth, comprising the steps of:*

*(a) transmitting a transmission signal;*

*(b) sensing the transmission signal reflected from at least one target and received at two different locations as two different receive signals;*

*(c) downconverting each of the two different received signals to two different doppler signals;*

*(d) determining the sum of and the difference between the two different doppler signals; and*

*(e) comparing the sum and difference to determine the deviation of the target from the reference azimuth.*

*22. A method for determining the deviation of a target about an automotive vehicle relative to a reference azimuth, comprising the steps of:*

*(a) providing a source frequency to at least one mixer;*

*(b) transmitting and receiving signals;*

*(c) transmitting the source frequency as a transmission signal;*

*(d) detecting the transmission signal reflected from the target and received at two different locations and providing a doppler signal comprising the sum of and the difference between the transmission signal detected at the two different locations; and*

*(e) comparing the sum and the difference doppler signals to determine the deviation of the target from the reference azimuth,*

*wherein the at least one mixer down converts the sum and difference in accordance with the source frequency to produce sum and difference doppler signals.*

*23. A method for tracking a target about an automotive vehicle, comprising the steps of:*

*(a) receiving input signals from a multi-lobe monopulse antenna;*

*(b) applying the received input signals to a junction;*

*(c) providing a transmission signal to an antenna through a sum port of a junction;*

*(d) mixing the sum and difference signals at the sum and difference ports of the junction with a source frequency to produce a sum frequency signal and a difference frequency signal;*

*(e) performing analog-to-digital conversion of the sum and difference frequency signals; and*

*(f) providing switching timing signals to a first and second data switch, and timing clock signals to an analog-to-digital converter.*

* * * * *